United States Patent
Susnjara

(10) Patent No.: US 6,416,450 B2
(45) Date of Patent: *Jul. 9, 2002

(54) MACHINE TOOL WITH IMPROVED TOOL CHANGER MEANS

(75) Inventor: Kenneth J. Susnjara, Birdseye, IN (US)

(73) Assignee: Thermwood Corporation, Dale, IN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,106

(22) Filed: Jul. 28, 1999

(51) Int. Cl.[7] .............................................. B23Q 3/157
(52) U.S. Cl. .............................. 483/47; 483/38; 483/50; 483/902; 294/110.1
(58) Field of Search ......................... 483/1, 4, 5, 7–11, 483/38, 47, 50, 51, 64, 902; 279/900; 211/69, 70.6; 294/110, 110.1, 110.2

(56) References Cited

U.S. PATENT DOCUMENTS

| | | | | |
|---|---|---|---|---|
| 3,568,849 A | * | 3/1971 | Hutchison | 211/70.6 |
| 3,604,565 A | * | 9/1971 | Freeman | 211/70.6 |
| 3,822,790 A | * | 7/1974 | Armour et al. | 211/70.6 |
| 3,823,466 A | * | 7/1974 | Jerue | 483/8 |
| 3,990,140 A | * | 11/1976 | Polacek et al. | 483/31 |
| 4,557,035 A | * | 12/1985 | Rutschle et al. | 483/47 |
| 4,621,409 A | * | 11/1986 | Weixel | 483/59 |
| 4,635,342 A | * | 1/1987 | Balding | 483/7 |
| 4,716,647 A | * | 1/1988 | Winkler et al. | 483/14 |
| 4,910,860 A | * | 3/1990 | Winkler et al. | 279/900 |
| 4,920,632 A | * | 5/1990 | Babel | 483/64 |
| 4,930,208 A | * | 6/1990 | Winkler et al. | 483/3 |
| 4,930,976 A | * | 6/1990 | Spacher et al. | 29/741 |
| 4,932,118 A | * | 6/1990 | Winkler et al. | 483/48 |
| 5,257,199 A | * | 10/1993 | Tsujino et al. | 483/4 |
| 5,439,434 A | * | 8/1995 | Sato et al. | 483/1 |
| 5,514,063 A | * | 5/1996 | Stoll et al. | 483/66 |
| 5,624,365 A | * | 4/1997 | Haninger et al. | 483/50 |
| 5,704,884 A | * | 1/1998 | Uemura et al. | 483/3 |
| 5,772,566 A | * | 6/1998 | Schweizer et al. | 483/47 |
| 5,860,901 A | * | 1/1999 | Haninger et al. | 483/47 |
| 5,908,374 A | * | 6/1999 | Kato | 483/42 |
| 5,979,519 A | * | 11/1999 | Susnjara | 144/48.1 |
| 6,039,680 A | * | 3/2000 | Oketani et al. | 483/57 |

* cited by examiner

Primary Examiner—A. L. Wellington
Assistant Examiner—Erica Ergenbright
(74) Attorney, Agent, or Firm—Stevens, Davis, Miller & Mosher, LLP

(57) ABSTRACT

A tool changer for a machine tool having a toolhead assembly including a spindle with device for detachable securing a tool thereto, generally consisting of at least one device for holding a tool detachably securable to the spindle, pivotally connected to the assembly and angularly displaceable in a plane including the axis of the spindle between a retracted position and an extended position for transferring a tool between the tool holding device and the spindle; and device for angularly displacing the tool holding device between such retracted and extended positions.

46 Claims, 5 Drawing Sheets

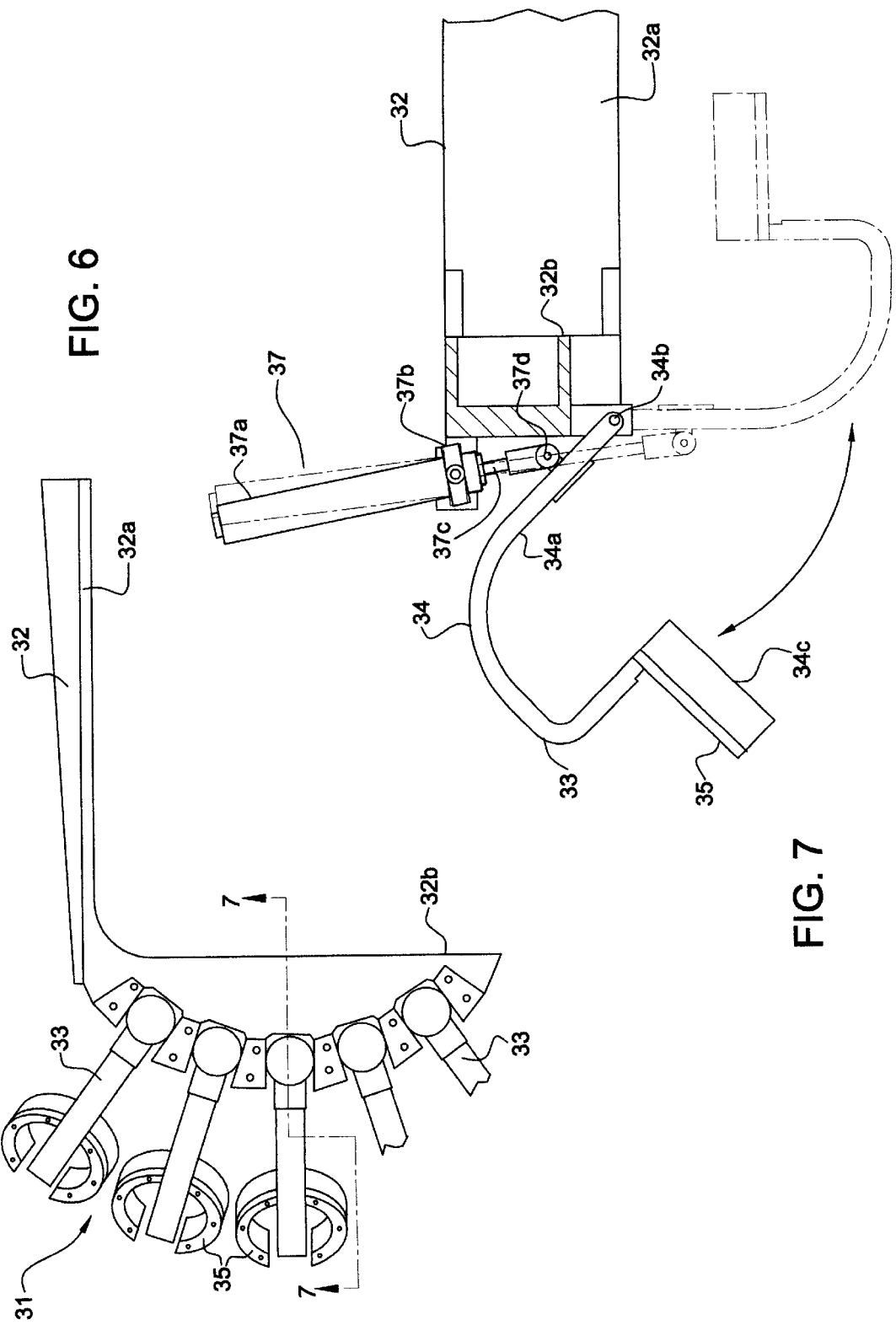

MACHINE TOOL WITH IMPROVED TOOL CHANGER MEANS

This invention relates to CNC machine tools and more particularly to a tool changer for such machines. The invention further contemplates a novel automatic tool changer operable to reduce the cycle times of machining parts requiring the use of different tools to perform various machining operations.

BACKGROUND OF THE INVENTION

In many machining operations performed by conventional CNC machine tools used in the woodworking, plastic and airframe industries, multiple tasks are required to be performed, requiring the use of different tools. Initially, tool changes were performed manually, simply by having the operator interrupt the operation of the machine, change out the tool and then resume operation. Because of the time consuming aspect of manual tool changes, automatic tool changes were developed which generally have involved moving the toolhead to a tool changer positioned on or adjacent the machine or moving the tool changer to the toolhead assembly to effect the tool change. In either of such arrangements, considerable machine motion and time has been required, resulting still in undue cycle times and less than optimal productivity. It thus has been found to be desirable and therefore the principal object of this invention to provide a tool changer for a CNC machine tool in which tool changes may be performed with minimal movement and rapidly, thereby reducing cycle times and correspondingly increasing productivity.

SUMMARY OF THE INVENTION

The present invention overcomes the disadvantages of prior art automatic tool changers by providing a tool changer mountable on the toolhead assembly of a CNC machine tool generally consisting of an array of tool holders pivotally connected to the toolhead assembly and spaced apart relative to the axis of the toolhead spindle, with each of the tool holders being selectively angularly displaceable in a plane including the axis of the spindle between a retracted position and an extended position aligning the tool holder for loading or unloading a tool with respect to the spindle. Through the use of the collet on the end of the toolhead spindle, various tools may not only be loaded and unloaded unto and off of the spindle but may be transferred between the tool holder assembly mounted on the toolhead assembly and tool holders either mounted on other components of the machine or on separate equipment.

BRIEF DESCRIPTION OF THE DRAWINGS

FIG. 6 is an enlarged, top plan view of the tool changer shown in FIGS. 1 through 3, embodying the present invention, having portions thereof broken away;

FIG. 7 is an enlarged cross sectional view taken along line 7—7 in FIG. 6;

DESCRIPTION OF THE PREFERRED EMBODIMENTS

Figure 1:
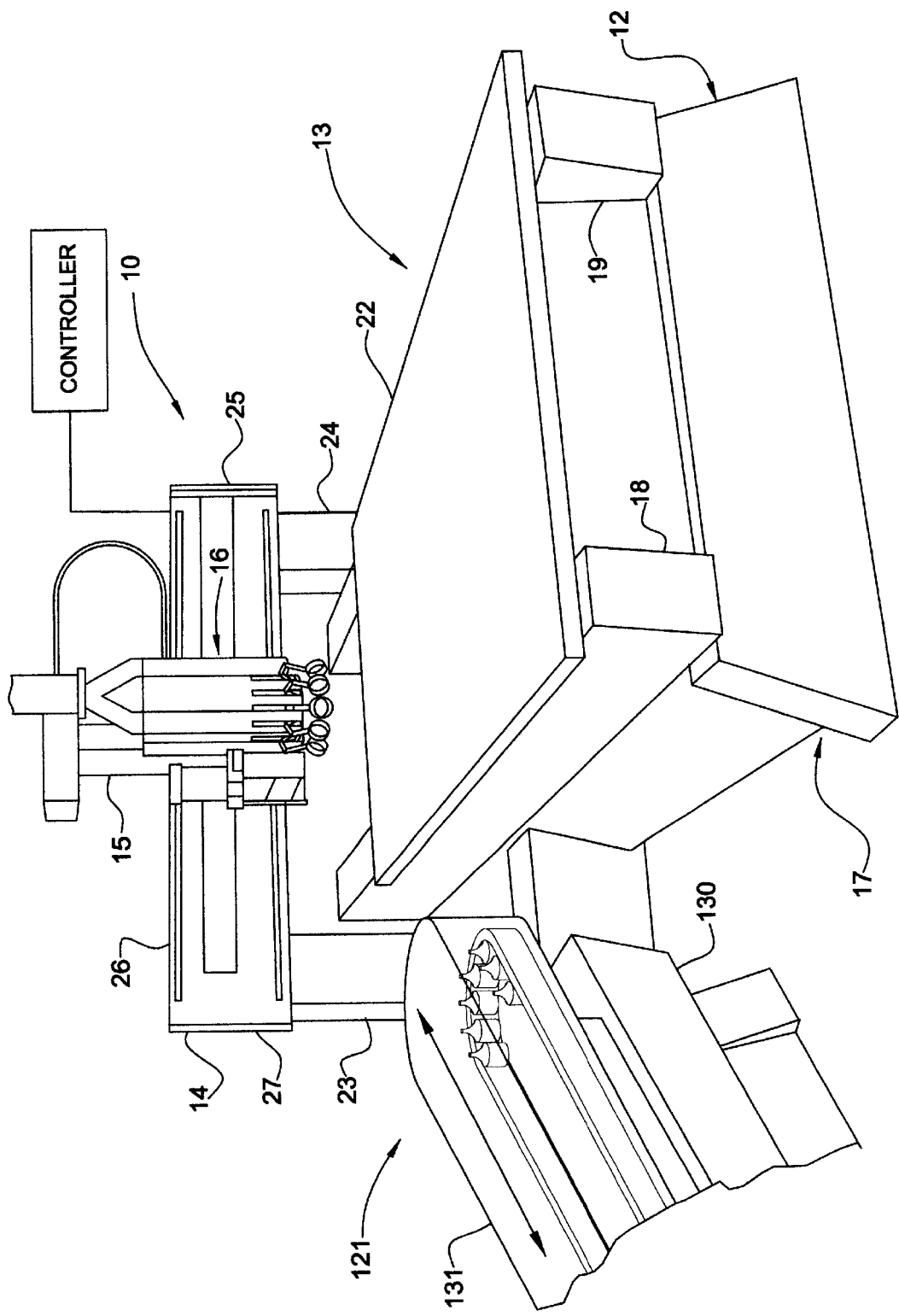
FIG. 1 is a perspective view of a CNC machine tool embodying the present invention, illustrating a portion of a conventional bulk tool changer which comprises a component of another embodiment of the invention.
Figure 2:
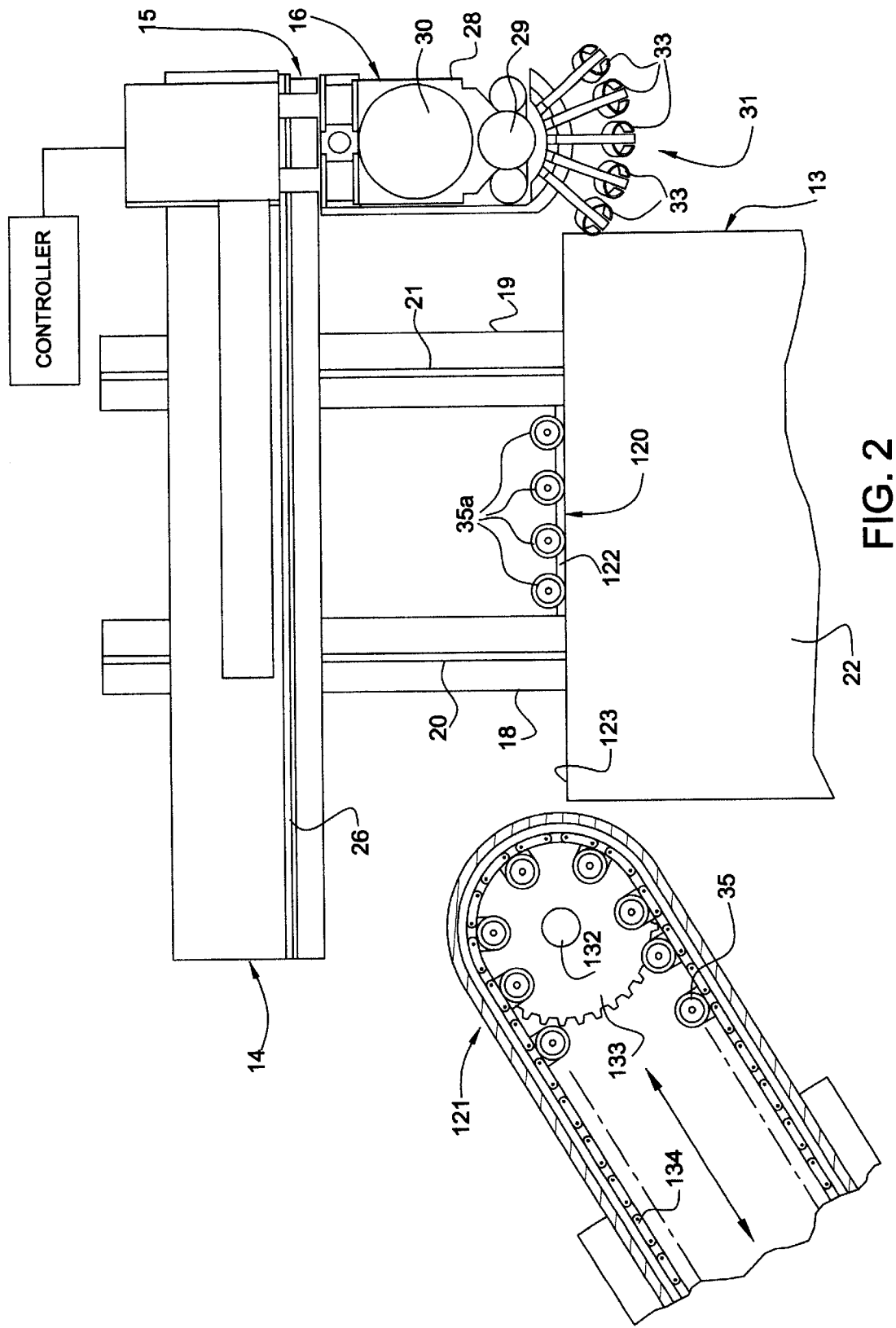
FIG. 2 is a top plan view of the machine tool and bulk tool changer shown in FIG. 1, having portions thereof broken away.
Figure 3:
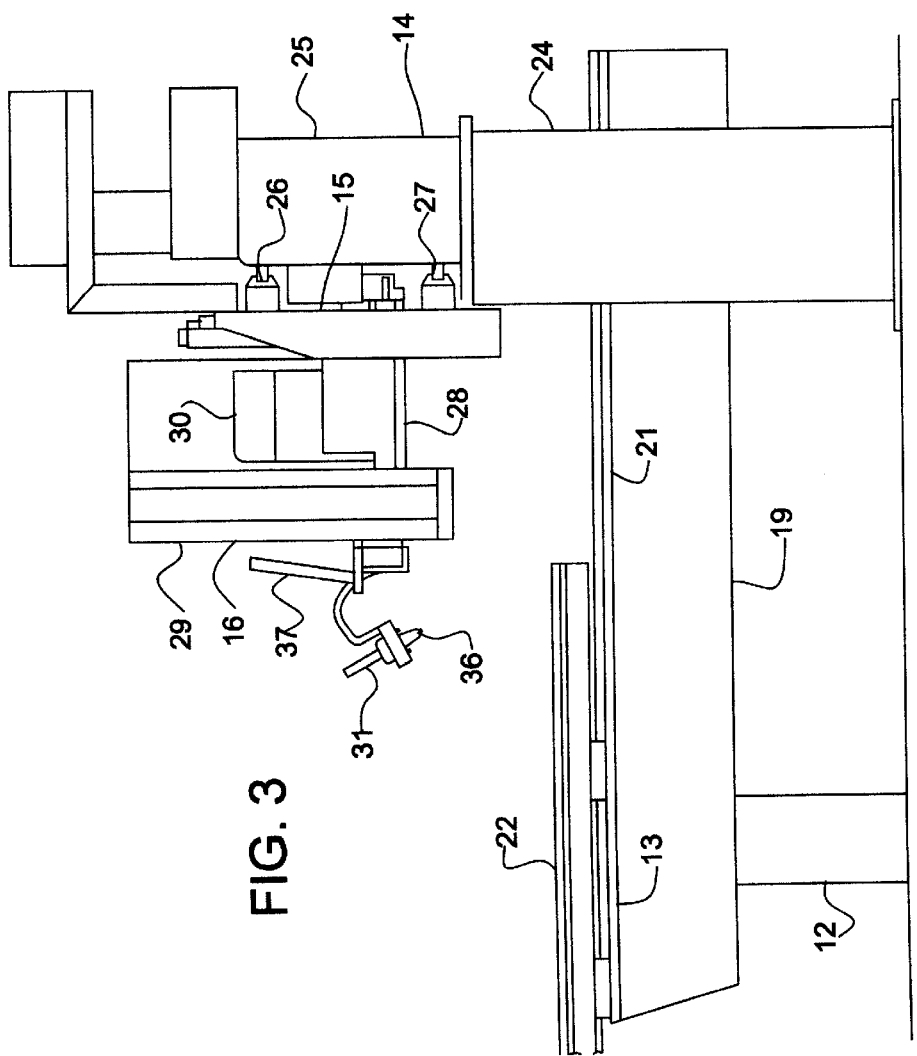
FIG. 3 is a side elevational view of the machine tool shown in FIGS. 1 and 2.

Referring to FIGS. 1 through 3, there is illustrated a CNC machine tool 10 adapted to perform various machining functions on workpieces positioned thereon including routing, drilling, sawing, sanding and the like, and a bulk tool changer 121. The machine generally consists of a base member 12, a movable workpiece support table 13, a gantry 14, a toolhead support assembly 15 and a toolhead assembly 16. The base member includes a lower section 17, a pair of longitudinally disposed, transversely spaced boxed beam sections 18 and 19 and a set of longitudinally disposed, transversely spaced guideways 20 and 21. Table 13 is supported and displaceable longitudinally or along an x-axis or line of travel on guideways 20 and 21, and includes a rectangularly configured workpiece support surface 22.

Gantry 14 includes a pair of leg sections 23 and 24 disposed astride table 13, rigidly connected at their lower ends to base section 17, and a bridge. section 25 secured to the upper ends of leg sections 23 and 24, spaced above table 13 and disposed transversely. The front face of bridge section 25 is provided with a pair of transversely disposed, vertically spaced guideways 26 and 27 on which there is mounted and guided, toolhead support assembly 15 for displacement transversely along a y-axis or line of travel. Toolhead assembly 16 similarly is mounted and guided vertically along a z-axis or line of travel on a pair of vertically disposed, transversely spaced guideways mounted on a front face of the toolhead support assembly.

Figure 8:
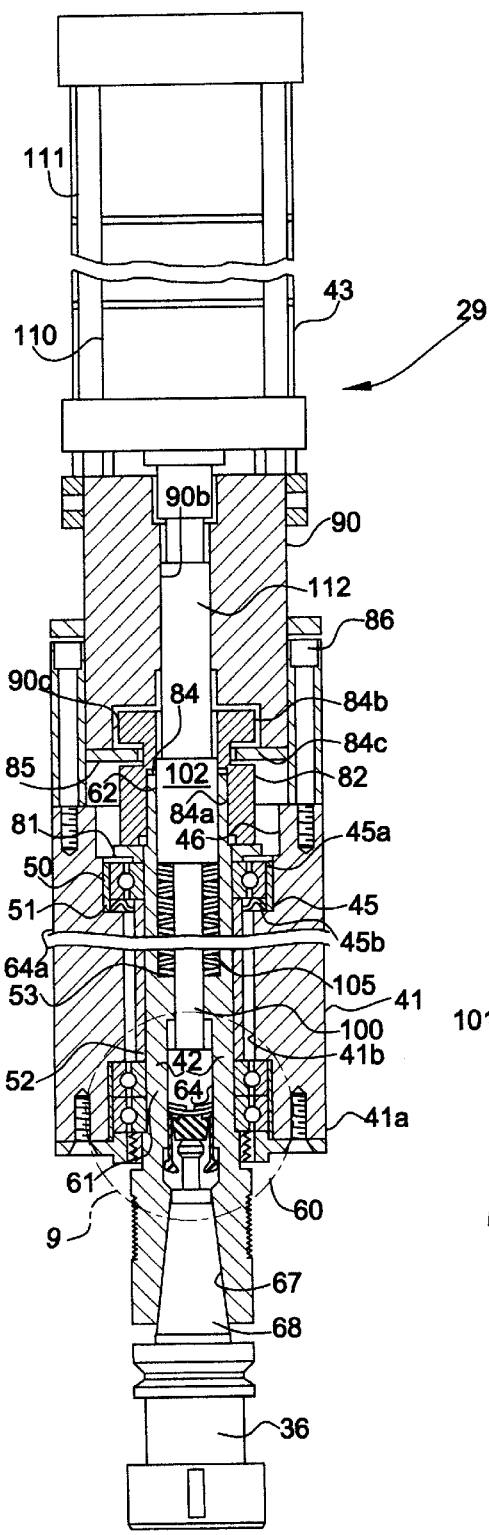
FIG. 8 is an enlarged, vertical cross sectional view of the spindle assembly forming a component of the toolhead assembly shown in FIGS. 1 through 3.
Figure 9:
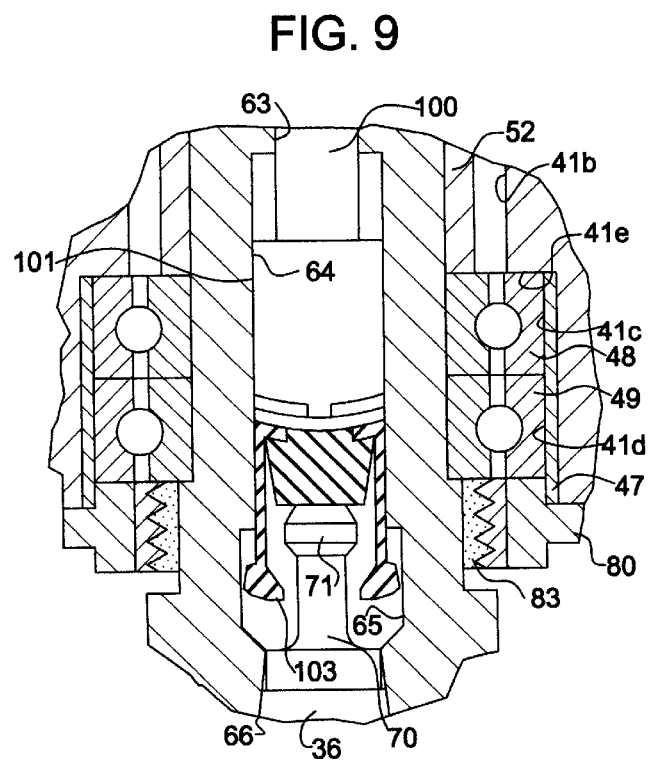
FIG. 9 is and enlarged view of the view shown in FIG. 8, designated by the reference numeral 9.

The toolhead assembly includes a support frame 28 and a spindle assembly 29, a DC servomotor 30 and a tool changer assembly 31 mounted on the support frame. The spindle assembly is best illustrated in FIGS. 8 and 9 and is driven through a belt drive by servomotor 30. Tool changer assembly 31 is best shown in FIGS. 4 through 7. In addition to servomotor 30, the machine is provided with a number of additional DC servomotors for displacing the table along the x-axis, displacing the toolhead support assembly along the y-axis and displacing the toolhead assembly along the z-axis. Such motors are operated by a controller (not shown) pursuant to the execution of a program loaded into the controller in the conventional manner.

Figure 4:
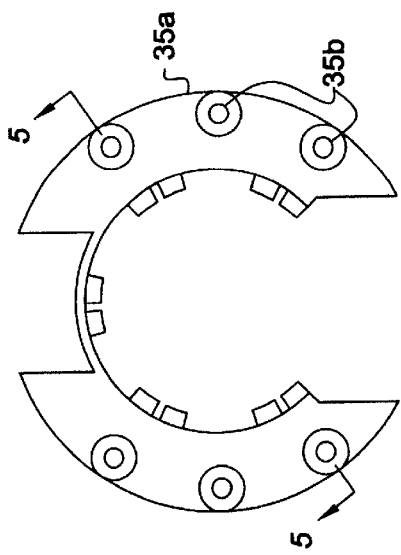
FIG. 4 is an enlarged top plan view of a gripper section of a tool holder comprising a component of the embodiment shown in FIGS. 1 through 3.
Figure 5:
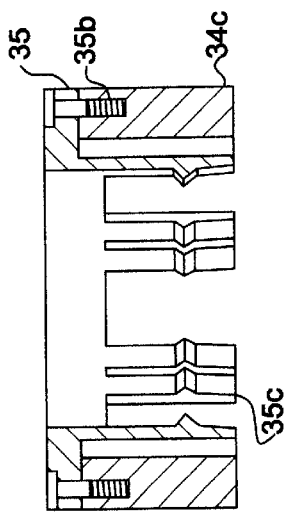
FIG. 5 is a cross sectional view taken along line 5—5 of FIG. 4.

As best shown in FIGS. 4 through 7, tool changer assembly 31 includes a support bracket 32 secured to support frame 28, and a plurality of arcuately spaced tool holders 33 pivotally connected to the support bracket. The support bracket includes a base section 32a mounted on the side of the support frame by means of a set of bolts or other suitable means, and disposed longitudinally, extending beyond the front end of the toolhead assembly, and a transversely disposed section 32b, spaced from and extending across the front of the assembly, substantially at a right angle relative to the base section. Each of the tool holders consists of an arm section 34 and a gripper section 35. Each arm section 34 has a j-shaped portion 34a pivotally connected to bracket section 32b, as at 34b and an arcuate portion 34c formed integrally on the end of the J-shaped portion. As best seen in FIGS. 4 and 5, gripper section 35 includes an arcuate portion 35a mounted on and secured to arcuate arm portion 34c by means of a set of bolts 35b, and arcuately spaced sets 35c of finger portions extending into the space in arcuate arm portion 34c and yieldably biased to engage a tool 36 therebetween as shown in FIG. 3. Each of the tool holders is provided with an air actuated cylinder assembly 37 for pivoting the tool holder between a retracted position as shown in solid lines in FIG. 7 and an extended position as shown in phantom lines in FIG. 7 in which tool gripper section 35 is disposed coaxially with and below a spindle of the toolhead assembly for yielding or accepting a tool relative to the spindle. Each cylinder assembly consists of a cylinder member 37a pivotally connected adjacent its rod end to transverse section 32b of the support bracket as at 37b, and an extendable rod member 37c pivotally connected to the arm section of a tool holder as at 37d. The various cylinder assemblies are operated by the controller pursuant to the execution of a software program loaded into the controller to selectively extend and retract selected tool holders for loading and unloading tools with respect to the spindle. The configuration of the arm sections and gripper sections of each of the tool holders permits each of the holders to hold and maintain a tool in a retracted position clear of the lower end of the spindle so as not to interfere with any machining operation of the spindle, and an extended position in which the collet of the spindle may grip or release a tool held by the holder. The inwardly biased fingers 35c of the gripping portion of each tool holder will yieldingly grip and hold a tool in the tool holder permitting the tool to be retained in the extended position for storage purposes, and displaced from the retracted to the extended position and easily be released or gripped in attaching and detaching the tool with respect to spindle.

Referring to FIGS. 8 and 9, the toolhead assembly includes a spindle assembly 29 generally consisting of a housing 41, a spindle 42 mounted in the housing and a cylinder assembly 43. The housing is provided with a lower section 41a and an upper section 41b. Housing section 41a is provided with a cylindrical bore 41f therethrough having a first enlarged section 41c at a lower end thereof, a second enlarged section 45 and a third enlarged section 46 at the upper end thereof. Enlarged bore section 41c provides a bearing seat including an annular wall 41d and an annular seat 41e. Enlarged section 45 similarly provides a bearing seat including an annular side wall 45a and an annular seating surface 45b. Provided in enlarged section 41c is a cylindrical sleeve 47 having the outer cylindrical surface thereof adhesively bonded to annular wall 41d of the housing. A pair of roller bearings 48 and 49 are seated in enlarged bore section 41c with the outer surfaces of the outer races thereof engaging the inner annular surface of cylindrical sleeve 47 and an annular end surface of outer race 48 engaging annular surface 41e of enlarged bore section 41c. Similarly, a cylindrical sleeve 50 is disposed in enlarged bore section 45 with the outer cylindrical surface thereof adhesively bonded to the annular side wall surface 45a of enlarged bore section 45. Disposed within cylindrical sleeve 50 and axially displaceable relative thereto is roller bearing 51. The inner races of bearings 48 and 51 are maintained in axially spaced relation by means of a spacer tube 52. A spring washer 53 is provided between the outer race of bearing 51 and annular surface 45b of enlarged bore section 45.

Spindle 42 has a generally tubular configuration and is journaled in lower bearings 48 and 49 and upper bearing 51. Outer cylindrical surface 60 is provided with a recessed cylindrical section 61 providing an annular shoulder on which the inner race of bearing 49 is seated, and an upper threaded portion 62. It further is provided with an axially disposed bore 63 having a lower, first enlarged section 64 and a second enlarged section 65 opening into an end portion 66 provided with a diverging, conically configured wall 67 adapted to receive an upper portion 68 of a tool 36, provided with a complimentary conical surface relative to surface 67. The upper end of the tool is provided with a neck portion 70 and a head portion 71 received within enlarged bore section 64 of the spindle. The upper end of axial bore 63 is provided with an enlarged section 72.

The bearings and the spindle journaled in the bearings are retained within the housing with the bearings seated within enlarged bore sections 41c and 45. by means of a lower cover plate 80, a bearing washer 81 and a jam nut 82. Cover plate 80 has an annular configuration and is secured to the bottom end of housing 11 by a set screws. An inner end of plate 80 engages the outer race of bearing 49 and is provided with a seal 83 engaging the spindle about the periphery thereof Bearing washer 81 also has an annular configuration and has a depending, annular portion which engages the inner race of bearing 51. Jam nut 52 is provided with an axial bore 84 having an enlarged, threaded section 84a threaded onto the upper threaded end of the spindle so that it engages bearing washer 81 which bears on the inner race of bearing 51 . Outer annular surface 84b of the jam nut is provided with an annular recess 84c which is adapted to receive a pair of semi-circular retaining flanges 85.

Upper housing section 41b has a cylindrical configuration and is adapted to seat on and be secured to the upper end of lower housing section 41a by means of a set of bolts 86. Such section is axially aligned with axial bore 41f of lower housing section 41a. Mounted within upper housing section 41b is a floating cylinder mount 90 provided with an axially disposed bore 90a aligned axially with lower housing bore 41f and spindle 42, having a lower enlarged section 90a which receives the upper end of jam nut 82. Axial displacement of the cylinder mount is restricted relative to the spindle by means of retainer plates 85 which are secured to the underside of the cylinder mount by means of a set of screws, and project into annual grove 84c of jam nut 82.

Axially displaceable in spindle bore 63 is a draw bar 100 having a lower enlarged section 101 disposed in enlarged spindle bore section 64 and an upper enlarged section 102 received in an upper enlarged section 64a of spindle bore 63. A collet 103 is provided on the lower end of enlarged draw bar section 101 having a set of fingers which are adapted to cam inwardly when the draw bar is urged in an upward direction to grip head portion 71 of the tool, and to spring apart when the draw bar is moved in a downward direction to release the head portion of the tool. The draw bar is urged into the upper position by means of a set of spring washers 105 disposed between an annular shoulder provided by enlarged spindle bore section 64a and a lower cylindrical surface of enlarged draw bar section 102.

Cylinder assembly 43 includes a cylinder 110 retained in a frame 111 secured to the upper end of cylinder mount 90 and a rod member 112 which extends through bore 90b of the cylinder mount in axial alignment with draw bar 100. When rod member 112 is in the retracted position, it will be out of engagement with enlarged draw bar section 102 so that spring washers 105 will urge the draw bar into an upper position causing the fingers of the collet to be cammed inwardly and grip head portion 71 of the tool and correspondingly secure the tool to the spindle for performing a machining function. When the rod member is extended as shown in FIGS. 8 and 9, the rod member will engage and downwardly displace the draw bar against the biasing action of spring washers 105, allowing the fingers of collet 103 to spring apart and thus release the head portion of the tool, allowing it to be removed from the lower end of the spindle. The detachment of rod member 112 from draw bar 100 permits the draw bar to rotate as part of the spindle assembly during machining operations.

In the normal operation of the spindle assembly to perform a machine function, the tool will be received in the lower end of the spindle and firmly gripped by the collet formed on the lower end of draw bar, and the spindle with the tool will be free to rotate relative to the housing, the cylinder mount and the cylinder assembly. When it is desired to change the tool, the spindle drive is discontinued, suitable controls are operated to supply air under pressure to the base of the cylinder 110, to extend rod member 112 into engagement with the draw bar against the biasing actin of spring washers 105, thus causing the collet to displace downwardly and permit the gripping fingers thereof to spring outwardly, releasing the tool. A new tool then may be inserted into the lower end of the spindle and the cylinder assembly operated to allow the draw bar to displace upwardly under the biasing action of the spring washers thus causing the gripping fingers of the collet to be cammed inwardly and grip the upper end of the tool.

Most machining operations on a particular workpiece have been found not to require more than five tools to perform the desired machining operation. Accordingly, up to five tools required by a particular software program to be run may be inserted in one or more of the tool holders carried by the toolhead assembly to perform the desired machining operation. Once the appropriate number of tools have been loaded on the tool changer as described, and the appropriate program has been loaded into the controller of the machine, the controller will execute the program to load and unload the proper tools with respect to the spindle and in the appropriate sequence, the spindle will be stopped and started as required and the toolhead assembly will be displaced along the x, y and z axes to perform the programmed machining operation. Whenever a tool on the spindle is to be changed, the spindle will be stopped, a selected air cylinder will be operated to angularly displace a selected tool holder from the retracted to the extended position below and in axial alignment with the tool attached to the lower end of the spindle to grip the tool, the tool head assembly will be displaced downwardly along the z-axis to position the attached tool in the aligned tool holder permitting the spring biased fingers of the tool holder to grip the tool, cylinder assembly 43 will be operated to extend the draw bar of the spindle assembly to cause the fingers of collet 103 to spring outwardly and release the tool, and the air cylinder for such a tool holder is operated to displace the tool holder from the extended position shown in phantom lines in FIG. 7 to the retracted position as shown in solid lines therein. The machine is then ready to receive another tool carried by the tool changer. Such loading occurs simply by the operation of the cylinder assembly for the other selected tool whereby the tool holder of the selected tool will be caused to be angularly displaced from its retracted position to its extended position, positioning the selected tool below the spindle in axial alignment therewith. The selected tool is then attached to the lower end of the spindle by operating cylinder assembly 43 to allow the collet at the lower end of the spindle to move upwardly, camming the fingers thereof inwardly to grip and thus retain the head portion of the selected tool. The tool head assembly may then be displaced along the z-axis as well as the x and y-axes to continue the machining operation.

Each of tool holders 33 mounted on support bracket 32 is operable to be angularly displaced in a plane including the axis of spindle 42 so that when displaced from its retracted to its extended position, its gripper section 35 will be positioned below and in axial alignment with spindle 42 to permit the relinquishment or receipt of a tool. Such tool changing operation can be performed as the toolhead assembly is displaced along the x, y and/or z-axis of the machine, moving from one coordinate to another. By being capable of effecting a tool change while the toolhead assembly is repositioned, the cycle time of the machining operation being performed is substantially reduced. Furthermore, because of the simple and lightweight construction of the tool holders, the dynamics in the displacement of the toolhead assembly are negligently effected.

In a sense, tool holders 33 resemble and function like the arms of an early typewriter in which an arm corresponding to a certain key would angularly displace and strike a platen upon the key being pressed.

To expand the number of tools that may be used to perform a particular machining operation, the tool changer as described may be used in conjunction with a conventional tool bar 120 mounted on the machine or a conventional bulk tool changer 121 as best shown in FIG. 2. The bar tool changer typically consists of a base plate 122 mounted on the rear edge 123 of the machine table, and a number of transversely spaced tool grippers 35*a* which are comparable in construction and function to tool grippers 35. By displacement of the machine table along the x-axis and the displacement of the toolhead. assembly along the y and z-axes, spindle 42 may be positioned in axial alignment with a selected one of tool grippers 35*a* to relinquish and receive a tool in the manner as described in connected with tool changer assembly 31. Furthermore, through the use of the collet arrangement on spindle 42, tools may be transferred between any of tool grippers 35 and tool grippers 35*a*.

Bulk tool changer 121 consists of a separate apparatus which may be positioned adjacent to the machine and operated in cooperation with the toolhead assembly by the controller to accept tools from and provide tools to the spindle of the toolhead assembly. It consists of a base member 30 which is adapted to be positioned adjacent a side of a machine table, close to the gantry, and a carriage 131 mounted on the base member and displaceable longitudinally. Journaled at each end of the carriage is a vertically disposed shaft 132 having a gear 133. An endless chain 134 is trained about each of gears 133 and is provided with a plurality of tool grippers 35 spaced along the length thereof Each of tool grippers 35 is similar to each of tool grippers 35 of tool changer assembly 31 and tool grippers 35*a* of bar tool changer assembly 120, and may be positioned below and in axial alignment with spindle 42 of the toolhead assembly. The bulk tool changer is provided with various drives for longitudinally displacing the carriage thereof and rotating a gear shaft 132 to index the tool grippers, thus permitting a selected one of tool grippers 35 to be positioned at a location where spindle 42 of the toolhead assembly may be positioned in axial alignment therewith.

The toolhead assembly may be used in conjunction with the bulk tool changer assembly to either change a tool as between spindle 24 and the bulk tool changer or transfer one or more tools between the bulk tool changer and toolhead mounted tool changer 31. This is accomplished merely by operating the controls of the bulk tool changer to displace the carriage thereof and index the chained conveyor to position a selected tool thereon to a selected position, and then operating other machine controls to displace the toolhead assembly so that spindle 42 may be displaced to a position above and in axial alignment with a tool retained by a tool gripper of the bulk tool transfer assembly at the selected position. The cylinder assembly of the spindle may then be operated to cause the collet component of the spindle to grip the selected tool in the manner previously described. If the tool thus retrieved from the bulk tool changer assembly is to be transferred to a tool holder of tool changer assembly 31, the selected one of the tool holders of such assembly is then operated to transfer the tool from the spindle to the selected tool holder.

Tool changer assembly 31 may be used independently or in conjunction with one or both of bar tool changer assembly 120 and bulk tool changer assembly 121 to provide a greater availability of tools and a minimum amount cycle time in the performance of a machining operation. The arrangement further permits a program used to operate the machine to be devised in a manner whereby prior to the execution of the machining function with respect to a particular workpiece, the machine will be caused to select the appropriate tools from either or both of the bar or bulk tool changer assemblies and mount them on the toolhead mounted tool changer assembly. Such preliminary routine would be repeated upon each new machining procedure.

To minimize the effects of the additional mass possibly adversely affecting the dynamics of the movement of the toolhead assembly, the components of a tool changer assembly 31 are formed of a lightweight materials such as aluminum, plastic and perhaps lightweight composite materials. Any form of gripping device may be utilized allowing for the proper gripping, retaining and releasing of the various tools used with the assembly.

Although the invention has been described in the context of a CNC machine tool utilizing a moveable table and a stationary gantry, it is contemplated within the scope of the invention may be used with a CNC machine provided with a stationary table and a moveable gantry. In either of such arrangements, it further is contemplated that the toolhead mounted tool changer assembly as described may be used independently or in conjunction with either or both a bar tool changer assembly and a bulk tool transfer assembly as described.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A tool changer for a machine tool having a toolhead assembly including a spindle with means for detachably securing a tool thereto, comprising:

at least one means for releasably holding a tool detachably securable to said spindle, pivotally connected to said assembly and angularly displaceable in a plane including the axis of said spindle between a retracted, nontransfer position wherein a tool is stored therein and an extended, transfer position for releasing a tool to or accepting a tool from said spindle; and means for angularly displacing said at least one holding means between said retracted, nontransfer and extended, transfer positions, operable to maintain said at least one holding means at said extended transfer position while the tool is released to or accepted from said spindle, and then to displace said at least one holding means to said retracted, nontransfer position;

wherein in operation, once said tool is released from said at least one holding means to said spindle, said means for angularly displacing is operable to displace said at least one holding means to said retracted, nontransfer position while said tool is held by said spindle.

2. A tool changer according to claim 1 wherein said at least one holding means includes a gripping section disposable in axial alignment with said spindle when said at least one holding means is in said extended, transfer position, for yieldably gripping a tool.

3. A tool changer according to claim 2 wherein said gripping section includes a set of spring biased portions.

4. A tool changer according to claim 2 wherein said gripping section includes a set of arcuately spaced, substantially parallel finger portions, biased radially inwardly relative to the axis of a circumference including an arc along which said finger portions are spaced.

5. A tool changer according to claim 1 wherein said at least one holding means has a J-shaped arm section pivotally connected to said assembly and a gripping section disposable in axial alignment with said spindle when said at least one holding means is in said extended, transfer position for yieldably gripping a tool.

6. A tool changer according to claim 5 wherein said gripping section is disposed on a free end of said arm section.

7. A tool changer according to claim 6 wherein said gripping section includes a set of arcuately spaced, substantially parallel finger portions, biased radially inwardly relative to the axis of a circumference including an arc along which said finger portions are spaced.

8. A tool changer according to claim 1 wherein said displacing means is operated by a controller.

9. A tool changer according to claim 1 wherein the operation of said displacing means is controlled by a program executed by a controller.

10. A tool changer according to claim 1 wherein said displacing means comprises a fluid actuated cylinder assembly.

11. A tool changer according to claim 1 wherein said displacing means comprises an air actuated cylinder assembly.

12. A tool changer according to claim 1 including a plurality of said at least one holding means arcuately spaced relative to the axis of said spindle, each angularly displaceable between said retracted, nontransfer and extended transfer positions by a separate displacing means.

13. A tool changer according to claim 12 wherein said displacing means are selectively operated by a controller.

14. A tool changer according to claim 12 wherein the operation of said displacing means is controlled by a program executed by a controller.

15. A tool head assembly for a machine tool comprising:

a support means mountable on said machine tool;

a spindle supported on said support means and having means for detachably securing a tool thereto;

at least one means for releasably holding a tool detachably securable to said spindle, pivotally connected to said support means and angularly displaceable between a retracted, nontransfer position wherein a tool is stored therein and an extended, transfer position for releasing a tool to or accepting a tool from said spindle; and means for angularly displacing said at least one holding means between said retracted, nontransfer and extended, transfer positions, operable to maintain said at least one holding means at said extended transfer position while the tool is released to or accepted from said spindle, and then to displace said at least one holding means to said retracted, nontransfer position;

wherein in operation, once said tool is released from said at least one holding means to said spindle, said means for angularly displacing is operable to displace said at least one holding means to said retracted, nontransfer position while said tool is held by said spindle.

16. A toolhead assembly according to claim 15 wherein said at least one holding means includes a gripping section disposable in axial alignment with said spindle when said at least one holding means is in said extended, transfer position, for yieldably gripping a tool.

17. A toolhead assembly according to claim 16 wherein said gripping section includes a set of spring biased portions.

18. A toolhead assembly according to claim 16 wherein said gripping section includes a set of arcuately spaced, substantially parallel finger portions, biased radially inwardly relative to the axis of a circumference including an arc along which said finger portions are spaced.

19. A toolhead assembly according to claim 15 wherein said at least one holding means has a J-shaped arm section pivotally connected to said support means and a gripping section disposable in axial alignment with said spindle when said at least one holding means is in said extended, transfer position, for yieldably gripping a tool.

20. A toolhead assembly according to claim 19 wherein said gripping section is disposed on a free end of said arm section.

21. A toolhead assembly according to claim 20 wherein said gripping section includes a set of arcuately spaced, substantially parallel finger portions, biased radially inwardly relative to the axis of a circumference including an arc along which said fingers are spaced.

22. A toolhead assembly according to claim 15 wherein said displacing means is operated by a controller.

23. A toolhead assembly according to claim 15 wherein the operation of said displacing means is controlled by a program executed by a controller.

24. A toolhead assembly according to claim 15 wherein said displacing means comprises a fluid actuated cylinder assembly.

25. A toolhead assembly according to claim 15 wherein said displacing means comprises an air actuated cylinder assembly.

26. A toolhead assembly according to claim 15 including a plurality of said at least one holding means arcuately spaced relative to the axis of said spindle, each angularly displaceable between retracted, nontransfer and extended, transfer positions by a separate displacing means.

27. A toolhead assembly according to claim 26 wherein said displacing means are selectively operated by a controller.

28. A toolhead assembly according to claim 26 wherein the operation of said displacing means is controlled by a program executed by a controller.

29. A tool changer system for a machine comprising:

a toolhead assembly including a spindle with means for detachably securing a tool thereto;

at least one first means for releasably holding a tool detachably securable to said spindle, pivotally connected to said assembly and angularly displaceable in a plane including the axis of said spindle between a retracted, nontransfer position wherein a tool is stored therein and an extended, transfer position for releasing a tool to or accepting a tool from said spindle;

displaceable means for angularly displacing said at least one first holding means between said retracted, nontransfer and extended, transfer positions, operable to maintain said at least one first holding means at said extended transfer position while the tool is released to or accepted from said spindle, and then to displace said at least one first holding means to said retracted, nontransfer position;

at least one second means for holding a tool detachably securable to said spindle mounted on said machine, accessible to said spindle for yielding a tool to or accepting a tool from said spindle; and means for positioning said spindle in relation to said at least one second holding means for transferring a tool therebetween;

wherein in operation, once said tool is released from said at least one first holding means to said spindle, said means for angularly displacing is operable to displace said at least one first holding means to said retracted, nontransfer position while said tool is held by said spindle.

30. A tool changer system according to claim 29 wherein said spindle includes a collet operable for selectively gripping and releasing a tool retained by either of said at least one first and at least one second holding means.

31. A tool changer system according to claim 29 wherein said at least one second holding means is stationary and said spindle is displaceable along orthogonal x, y and z-axes.

32. A tool changer system according to claim 31 wherein said at least one second holding means is mounted on a stationary worktable.

33. A tool changer system according to claim 31 wherein the angular displacement of said at least one first holding means and the displacement of said spindle along the x, y and z-axes is controlled by a programmed controller.

34. A tool changer system according to claim 29 wherein said at least one second holding means is displaceable along an x-axis and said spindle is displaceable along y and z-axes.

35. A tool changer system according to claim 34 wherein said at least one second holding means is mounted on a table displaceable along the x-axis.

36. A tool changer system according to claim 34 wherein the angular displacement of said at least one first holding means, the displacement of said at least one second holding means along the x-axis and the displacement of said spindle along the y and z-axes are controlled by a programmed controller.

37. A tool changer system for a machine comprising:

a toolhead assembly including a spindle with means for detachably securing a tool thereto;

at least one first means for releasably holding a tool detachably securable to said spindle, pivotally connected to said assembly and angularly displaceable in a plane including the axis of said spindle between a retracted, nontransfer position wherein a tool is stored therein and an extended, transfer position for releasing a tool to or accepting a tool from said spindle;

means for angularly displacing said at least one first holding means between said retracted, nontransfer and extended, transfer positions, operable to maintain said at least one first holding means at said extended transfer position while the tool is released to or accepted from said spindle, and then to displace said at least one first holding means to said retracted, nontransfer position;

at least one second means for holding a tool detachably securable to said spindle mounted on a unit separate from said machine, accessible to said spindle for yielding a tool to or accepting a tool from said spindle; and means for positioning said spindle in relation to said at least one second holding means for transferring a tool between said spindle and said at least one second holding means;

wherein in operation, once said tool is released from said at least one first holding means to said spindle, said means for angularly displacing is operable to displace said at least one first holding means to said retracted, nontransfer position while said tool is held by said spindle.

38. A tool changer system according to claim 37 wherein said unit includes a plurality of said second holding means and means for indexing selected ones of said second holding means in relation to said spindle for transferring a tool between said selected second holding means and said spindle.

39. A tool changer system according to claim 37 wherein said spindle is displaceable along orthogonal x, y and z-axis.

40. A tool changer system according to claim 37 wherein said machine includes a workpiece support table displaceable along an x-axis and said spindle is displaceable along y and z-axes.

41. A tool changer system according to claim 37 wherein said at least one first holding means and said spindle are displaceable responsive to a program executed by a controller.

42. A tool changer system according to claim 37 including at least one third means for holding a tool detachably securable to said spindle, mounted on said machine and accessible to said spindle for yielding a tool to or accepting a tool from said spindle, and wherein said positioning means also is operable for positioning said spindle in relation to said at least one third holding means for transferring a tool between said at least one third holding means and said spindle.

43. A tool changer system according to claim 42 wherein said spindle is displaceable along orthogonal x, y and z-axes.

44. A tool changer system according to claim 42 wherein said machine includes a workpiece support table displaceable along an x-axis and said spindle is displaceable along y and z-axes.

45. A tool changer system according to claim 42 wherein said at least one first holding means and said spindle are displaceable responsive to a selected program executed by a controller.

46. A tool changer system according to claim 45 wherein said at least one first holding means, said workpiece support table and said spindle are displaceable responsive to a program executed by a controller.

* * * * *